United States Patent
Russell et al.

(10) Patent No.: US 8,038,374 B2
(45) Date of Patent: Oct. 18, 2011

(54) CARGO RESTRAINT ANCHOR

(76) Inventors: Richard R. Russell, Birmingham, AL (US); Robert R. Russell, III, Altoona, AL (US)

(*) Notice: Subject to any disclaimer, the term of this patent is extended or adjusted under 35 U.S.C. 154(b) by 381 days.

(21) Appl. No.: 12/283,793

(22) Filed: Sep. 17, 2008

(65) Prior Publication Data

US 2010/0068000 A1 Mar. 18, 2010

(51) Int. Cl.
*B60P 7/08* (2006.01)

(52) U.S. Cl. .......................... 410/116; 410/106

(58) Field of Classification Search ............ 410/96, 410/97, 101, 102, 104, 106, 110, 116; 24/265 CD; 248/499

See application file for complete search history.

(56) References Cited

U.S. PATENT DOCUMENTS

| | | | |
|---|---|---|---|
| 4,818,162 A | 4/1989 | Zukowski et al. | |
| 5,416,956 A | 5/1995 | Rubin | |
| 5,516,246 A | 5/1996 | Helton | |
| 5,807,045 A | 9/1998 | Profit | |
| 5,836,060 A | 11/1998 | Profit | |
| 6,350,089 B1* | 2/2002 | Tekavec | 410/106 |
| 6,908,269 B1 | 6/2005 | Youngs et al. | |
| 7,090,449 B1 | 8/2006 | Hugg | |

* cited by examiner

*Primary Examiner* — Stephen Gordon
(74) *Attorney, Agent, or Firm* — Wm. Randall May

(57) ABSTRACT

A double-ended cargo restraint anchor for use with existing cargo tie-down straps on commercial transport vehicles, such as flatbed trailers, is disclosed. The restraint anchor allows cargo tie-down straps to always be situated inboard of the anchor bars or "rub rails" located on either side of the transport vehicle. The new restraint anchor complies with all governmental safety rules and transport regulations.

10 Claims, 4 Drawing Sheets

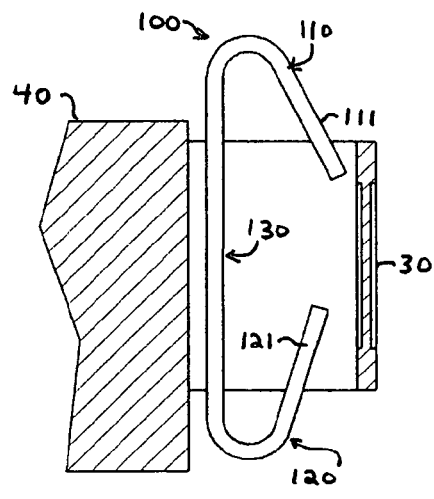
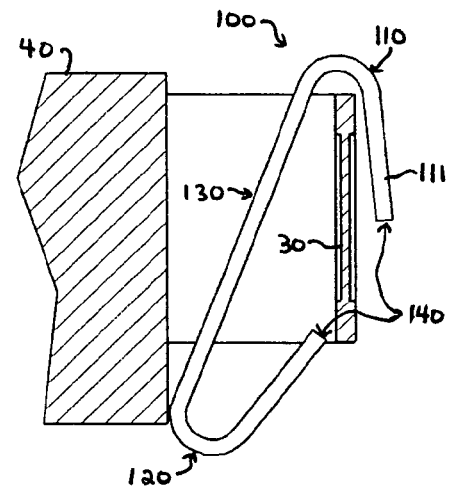
Fig. 4A  Fig. 4B
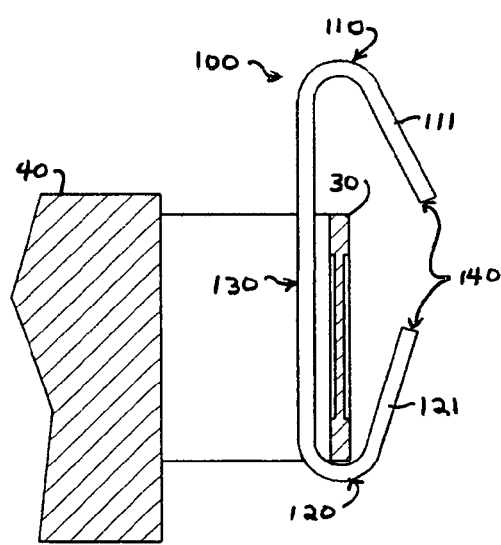
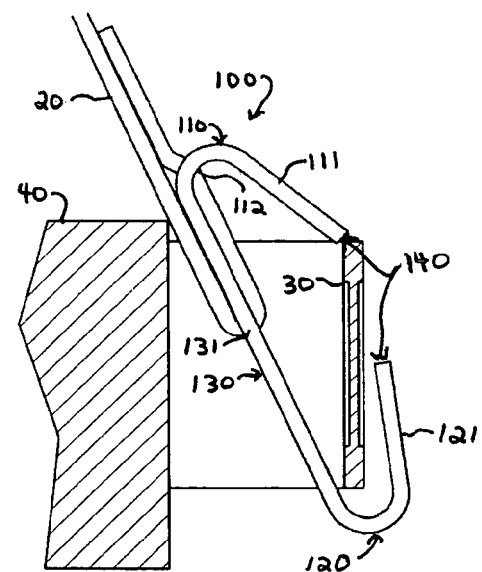
Fig. 4C  Fig. 4D

CARGO RESTRAINT ANCHOR

FIELD OF THE INVENTION

This invention relates generally to the commercial cargo transport industry. More particularly, the present invention relates to a new and improved apparatus for anchoring tie-down restraints used to secure cargo to the bed of open commercial trucks or flatbed trailers.

BACKGROUND OF THE INVENTION

Every day millions of trucks and commercial transport vehicles proceed about the world's highways carrying cargo to be distributed for industrial purposes, commercial or governmental purposes, or for personal use. The cargo carried on those trucks or commercial transport vehicles varies in size, weight, shape, and density. Different methods have been used to restrain the cargo during transport depending on the physical characteristics of the cargo and the regulatory requirements governing commercial cargo transport vehicles. In transport vehicles such as flatbed truck trailers the cargo restraint system employed usually involves blocking and tie-down restraints on the cargo items. In the great majority of cases travel and cargo transport is accomplished without incident. However, in too many cases the restraint system fails or becomes slack and the cargo moves about on the truck or transport vehicle and experiences damage, or a mishap occurs that interrupts the trip due to a problem with cargo shifting or loss. In more serious cases, an accident occurs which causes injury, loss of life, loss of property, and/or damage or impediment to the road or highway. In most cases the severity of the accident is increased by the shift or loss of cargo. It is not possible to appraise the total costs in money or life of the consequences from shifting or falling cargo on commercial trucks or transports. A majority of the incidents are caused by improper restraint of the cargo. Cargo is sometimes placed on a trailer with no restraint whatsoever, especially when the trip length is relatively short. At other times a restraint is applied but is ineffective in performing the intended function. Current regulations place the responsibility for proper restraint of cargo on the motor carrier or transport company and its officers, agents, drivers, representatives and employees. Government regulations in most countries require that cargo be restrained on commercial transport vehicles so as to prevent cargo movement to any degree that would detract from the safe operation of the transport vehicle. Cargo movement in the course of normal driving or transport is not permissible if it diminishes the ability of the transport vehicle to turn or brake in any way. The cargo restraint system utilized must insure that the cargo is contained, immobilized or secured such that during transport the cargo will not leak, spill, blow off the vehicle, fall from the vehicle, fall through the vehicle, otherwise become dislodged from the vehicle, or shift upon the vehicle to such an extent that the vehicle's stability or maneuverability is adversely affected.

Typical cargo restraint systems for open or flatbed commercial transport vehicles involve the use of heavy-duty synthetic straps or webbing which pass over or through the cargo and attach to the anchor bars or "rub rails" located on either side of the transport vehicle. Governmental regulations require that the cargo tie-down straps be attached and secured to the transport vehicle rub rails or anchor bars in such a way that prevents the straps from becoming loose, unfastening, opening or releasing while the vehicle is in transit.

Typical cargo restraint strap anchor devices in use today comprise open, flat, J-shaped hooks which are attached at either end of the restraint strap or webbing material and which are caused to engage a portion of the anchor bar or rub rail of the transport vehicle when tension is applied to the restraint strap. A ratchet device attached to the restraint strap is used to provide the required tension for proper cargo restraint. However, recently enacted regulations which require all tie-downs and other components of a cargo securement system used to secure loads on a trailer equipped with rub rails to be located inboard of the rub rails whenever practicable has created serious safety and compliance problems with the use of present tie-down anchor designs. The present design of anchors used to secure tie-down straps to anchor bars or rub rails does not allow the straps to be secured "inboard" of the bar or rail without resorting to unsafe, and therefore unacceptable, wrapping techniques. In order to meet regulations the tie-down strapping attached to the anchor must not be wrapped around the anchor bar or rub rail and the anchor must at all times be in constant contact with the anchor bar or rub rail. However, providing for constant contact with the anchor bar or rub rail using the present design of anchors is not always possible without wrapping the anchor strapping around the anchor bar or rub rail. This has caused most vehicle operators to risk breaking the law and thus opening themselves to being fined and/or suspended if caught. Another problem with the present design of cargo restraint anchors is the tendency of the anchor to fall away from the anchor bar or rub rail whenever the strapping material becomes loose or slack.

It would be expedient; therefore, to provide an improved apparatus for securing cargo tie-down straps to the anchor bars or rub rails of open or flatbed transport vehicles which complies with current governmental safety rules and transport regulations.

Known devices, such as those disclosed in applicant's information disclosure statement submitted herewith, are not without undesirable features, disadvantages, disabilities and/or limitations.

The present invention is a substantial modification and significant improvement over known designs and incorporates unique and novel design features which distinguish the invention over existing art.

SUMMARY OF THE INVENTION

In view of the foregoing, it is a primary object of this invention to provide a new and improved apparatus for anchoring and securing cargo restraint straps to the anchor bars or "rub rails" of typical cargo transport vehicles and which fully complies with all safety standards, rules and regulations relative thereto.

According to an embodiment of the invention, a cargo restraint anchor comprises a double-ended, essentially C-shaped, clasp having a frontal opening and dimensions which allow the apparatus to easily engage, and releaseably hold, the anchor bar or rub rail of a typical open transport vehicle, such as a flatbed trailer or railcar, for the purpose of securing cargo tie-down strapping material to said vehicle during transport.

An important advantage of the present invention is the provision of a new and improved anchoring apparatus for use with cargo restraint straps which allows the strapping material to be located and secured "inboard" of the anchor bars or rub rails of the transport vehicle.

Another important advantage of the present invention is the provision of a new and improved anchoring apparatus for use with cargo restraint straps which is designed so that the apparatus can only be attached or used in a manner which assures compliance with safety standards.

Another advantage of the present invention is the provision of a new and improved anchoring apparatus for use with cargo restraint straps which complies with all present governmental rules and regulations for safely transporting cargo in open transport vehicles.

Another advantage of the present invention is the provision of a new and improved anchoring apparatus for use with cargo restraint straps wherein one driver or operator can easily and safely secure cargo or loads to his transport vehicle in compliance with current regulations without resorting to alternative and potentially illegal methods or means.

A further advantage of the present invention is the provision of a new and improved anchoring apparatus for use with cargo restraint straps which eliminates the need for "edge protection" of the cargo strapping material.

Another advantage of the present invention is the provision of a new and improved anchoring apparatus for use with cargo restraint straps the design of which prevents the apparatus from falling away from the anchor bar or rub rail when the cargo restraint straps are loosened and provides constant contact with the anchor bar or rub rail during use.

A further advantage of the present invention is the provision of a new and improved anchoring apparatus for use with cargo restraint straps the design of which allows the apparatus to engage the top portion of the anchor bar or rub rail of the transport vehicle during the initial positioning and/or tightening of the cargo restraint straps.

Another advantage of the present invention is the provision of a new and improved anchoring apparatus for use with cargo restraint straps the design of which causes the apparatus to automatically engage the top portion of the anchor bar when the restraint straps become loose.

Another advantage of the present invention is the provision of a new and improved anchoring apparatus for use with cargo restraint straps which is "user friendly" and which can be used on all existing transport vehicles having rub rails or cargo anchor bars.

A further advantage of the present invention is the provision of a new and improved anchoring apparatus for use with cargo restraint straps which virtually eliminates driver or operator distraction or concern over cargo restraint and allows the driver or operator to more fully concentrate on other important duties during transport.

BRIEF DESCRIPTION OF THE DRAWINGS

The foregoing and other objects, features, and advantages of the present invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4A is a sequential side view of the embodiment of FIG. 1 showing the apparatus being positioned between the bed of a typical transport vehicle and the anchor bar or rub rail of said vehicle.

FIG. 4B is a sequential side view of the embodiment of FIG. 1 showing the apparatus engaging the top of the transport vehicle anchor bar or rub rail.

FIG. 4C is a sequential side view of the embodiment of FIG. 1 showing the apparatus engaging the bottom of the transport vehicle anchor bar or rub rail.

FIG. 4D is a sequential side view of the embodiment of FIG. 1 showing the apparatus engaged with the transport vehicle anchor bar or rub rail as the restraint strap attached to the apparatus is being tightened.

DETAILED DESCRIPTION OF THE DRAWINGS

Figure 1:
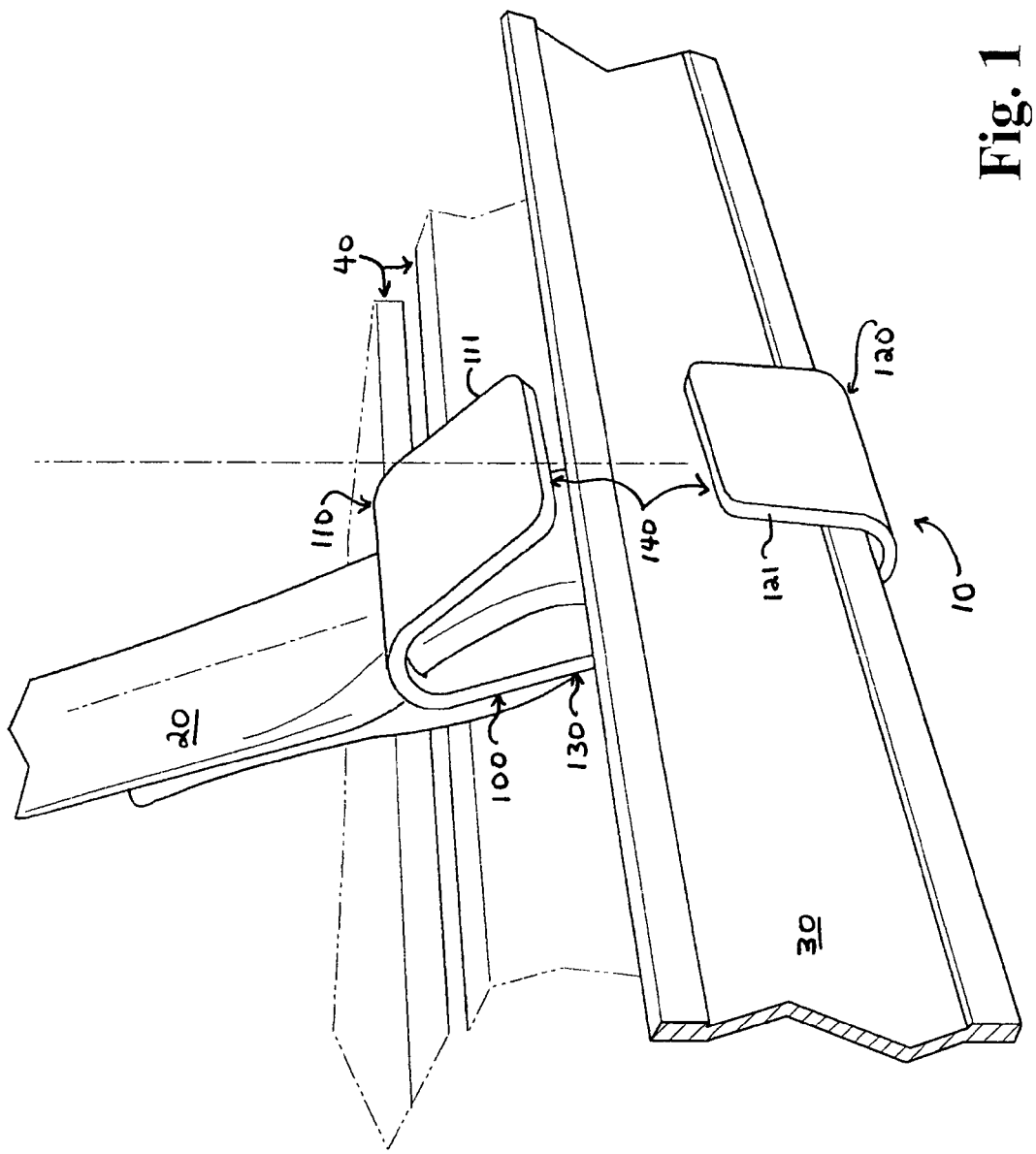
FIG. 1 is a perspective view of a preferred embodiment of the invention showing the invention in an engaged configuration with respect to a typical transport vehicle anchor bar or rub rail.

In accordance with an embodiment of the invention, FIG. 1 shows a cargo restraint anchor 10 having a cargo restraint strap 20 attached to said anchor 10 and showing anchor 10 engaging the "rub-rail" or "anchor bar" 30 of a typical open-top transport vehicle cargo bed 40. Typical rails/bars 30 in use with commercial transport vehicles generally extend along the entire length of the transport vehicle cargo bed 40. Said rail/bar 30 having an upper edge 31 and a lower edge 32 and being attached to, but spacably separated from, the cargo bed 40 of the transport vehicle.

The restraint anchor 10 has an essentially C-shaped cross-sectional configuration (as best viewed in FIG. 3) comprising a double-ended, open-front, clasp member 100. Said C-shaped clasp member 100 further comprising an arcuate top portion 110 defining an upper end 111, an arcuate bottom portion 120 defining a lower end 121, and a linear middle portion 130 completing the C-shaped configuration of said clasp member 100.

Figure 2:
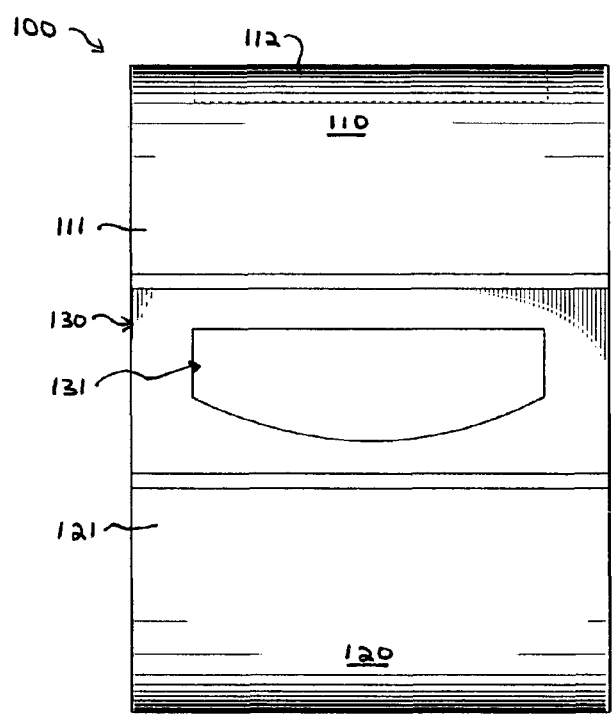
FIG. 2 is a front view of the embodiment of FIG. 1 shown without a cargo-restraining strap attached.
Figure 3:
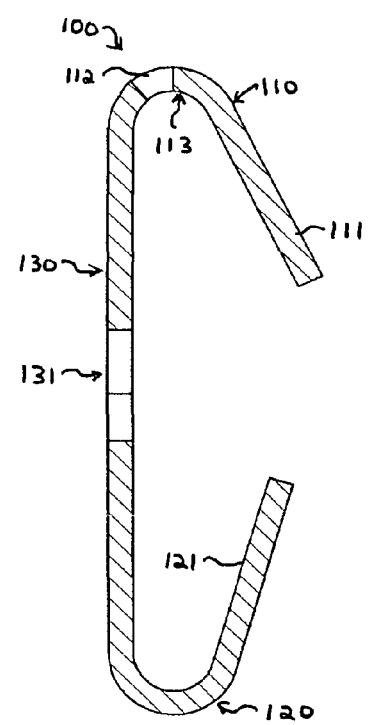
FIG. 3 is a sectioned side view of the embodiment of FIG. 1 showing the slots for attachment and positioning of a cargo-restraining strap.
Figure 4E:
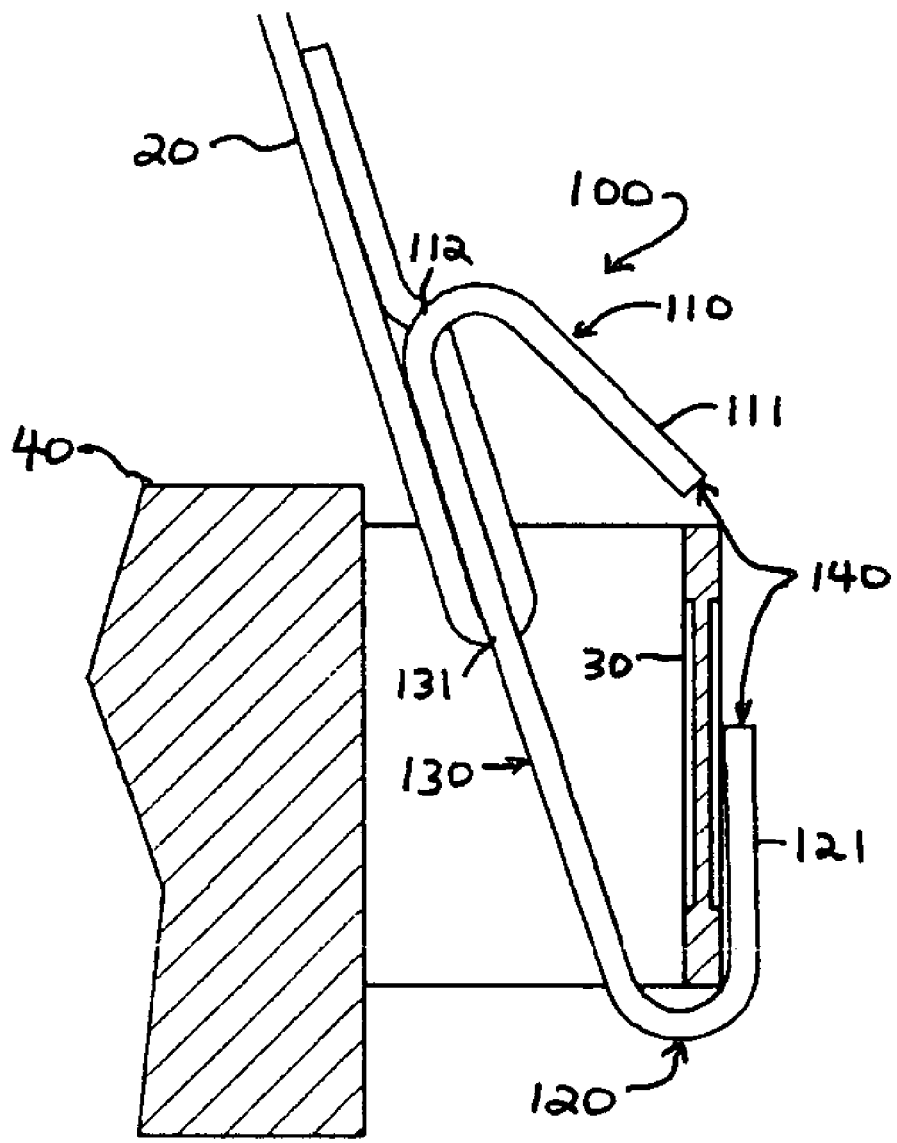
FIG. 4E is a sequential side view of the embodiment of FIG. 1 showing the apparatus fully engaged with the transport vehicle anchor bar or rub rail where the top of the apparatus is caused to slightly overhang the top of the anchor bar or rail.

In a preferred embodiment of the invention 10, the upper end 111 of said arcuate top portion 110 of said clasp member 100 defines an angle of approximately 27° with respect to the linear middle portion 130 of said clasp 100. The lower end 121 of said arcuate bottom portion 120 of said clasp member 100 defines an angle of approximately 17° with respect to the linear middle portion 130 of said clasp 100. The length of the linear middle portion 130 of said clasp member 100 is of sufficient dimension so as to create a space 140 between the upper end 111 of said top portion 110 of said clasp 100 and the lower end 121 of said bottom portion 120 of said clasp 100. As shown in FIG. 1 and sequential FIGS. 4A-4E, the spacing 140 between the upper end 111 of said top portion 110 and the lower end 121 of said bottom portion 120 of said clasp member 100 is sufficient to allow said clasp 100, when properly positioned and aligned, to engage the width of the rail or bar 30 of the transport vehicle cargo bed 40 within the area defined by the C-shaped configuration of the clasp member 100. As best shown in FIGS. 2 and 3, a slot 131, having linear dimensions sufficient to receive and accommodate the width and thickness of the cargo restraint strap 20 being used with the invention 10, is centrally positioned along the middle portion 130 of the clasp member 100. A second slot 112 is centrally positioned along the arcuate top portion 110 of the clasp member 100 near the apex 113 of the arc created by the configuration of said top portion 110. Said second slot 112 receives a portion of said restraint strap 20 and provides proper alignment of the strap 20 in relation to the clasp member 100. In use, the cargo restraint strap 20 is attached to the clasp member 100 by threading or looping one end of the cargo restraint strap 20 through the centrally positioned slot 131 along the middle portion 130 of said clasp member 100 and then upward through the second slot 112 of said clasp 100 whereupon said strap 20 is permanently adhered to, or otherwise attached to, another portion of the strap 20 as best shown in sequential FIGS. 4D and 4E.

In operation, referring now particularly to sequential FIGS. 4A-4E, the transport vehicle operator responsible for restraining the cargo being transported inserts the clasp member 100, with restraint strap 20 attached thereto, between the transport vehicle cargo bed 40 and its rub rail or anchor bar 30 at a chosen location along said rail/bar 30. The clasp member 100 is then caused to engage the upper edge 31 of said rail/bar 30 through the open space 140 between the top portion 110 and bottom portion 120 of said clasp member 100 so that said upper edge 31 is positioned at or near the apex 113 of said top portion 110. The bottom portion 120 of the clasp 100 is then rotated counterclockwise so as to allow the lower edge 32 of said rail/bar 30 to pass through the space 140 between the top portion 110 and bottom portion 120 of the clasp member 100. The restraint strap 20 is then tightened as necessary to restrain the cargo being transported by the transport vehicle. As the restraint strap 20 is being tightened, the clasp member 100 is caused to fully engage the lower edge 32 of the rail/bar 30 of the transport vehicle cargo bed 40 whereupon the lower end 121 of the bottom portion 110 of said clasp 100, upon engaging said lower edge 32 of said rail/bar 30, causes the clasp member 100 to rotate clockwise so that the upper end 111 of the top portion 110 of said clasp 100 is caused to slightly overhang the upper edge 31 of said rail/bar 30. This slight overhang of the upper end 111 of said top portion of said clasp 100, along with the angle of said upper end 111 with respect to the middle portion 130 of said clasp 100, causes the top portion 110 of the clasp 100 to engage the upper edge 31 of said rail/bar 30 when the restraint strap 20 becomes loose or loses tension thereby preventing the clasp 100 from falling away and/or becoming entangled with other parts of the transport vehicle during cargo transport.

While the invention has been particularly shown and described with reference to the preferred embodiment thereof, it will be understood by those skilled in the art that various alterations in form, detail and construction may be made therein without departing from the spirit and scope of the invention.

The embodiments of the invention in which an exclusive property right or privilege is claimed are defined as follows:

1. A cargo restraint anchoring device adapted for use with open-bed transport vehicles provided with anchor rails along the perimeter of said vehicle bed, said cargo restraint anchoring device comprising:
    a C-shaped clasp body comprising:
        a linear component defining an internal surface and an external surface;
        an arcuate upper component defining an internal surface and an external surface and defining an acute angle between the internal surface of said upper component and the internal surface of said linear component and further defining an upper edge;
        an arcuate lower component defining an internal surface and an external surface and defining an acute angle between the internal surface of said lower component and the internal surface of said linear component and further defining a lower edge;
    a means for receiving and securing a cargo restraint strap member to said clasp body, said means comprising:
        a first strap opening defined within the linear component of said clasp body; and,
        a second strap opening defined within the arcuate upper component of said clasp body.

2. The apparatus of claim 1, wherein the acute angle defined by said arcuate upper component of said clasp body is greater than the acute angle defined by said arcuate lower component of said clasp body.

3. The apparatus of claim 1, wherein the angle defined by said arcuate upper component of said clasp body is 27°, and the angle defined by said arcuate lower component of said clasp body is 17°.

4. The apparatus of claim 1, wherein said first strap opening of said means for receiving and securing said cargo restraint member to said clasp body is centrally positioned within the linear component of said clasp body and wherein said second strap opening of said means for receiving and securing said cargo restraint member is centrally positioned within the arcuate upper component of said clasp body.

5. The apparatus of claim 4, wherein said second strap opening is positioned along said arcuate upper component of said clasp body so as to provide for proper alignment of said cargo restraint member with respect to said clasp body when said clasp body is engaged with an anchor rail of an open-bed transport vehicle.

6. The apparatus of claim 1, wherein the upper edge defined by the upper component of said clasp body and the lower edge defined by the lower component of said clasp body are spaced apart so as to create a gap between said upper edge and said lower edge wherein said gap is of sufficient dimension as to allow said clasp body to be positioned onto an anchor rail of an open-bed cargo transport vehicle.

7. The apparatus of claim 1, wherein said cargo restraint anchoring device is mounted to one of said open-bed transport vehicle anchor rails so that the linear component of said device is located inboard of said anchor rail.

8. The apparatus of claim 4, wherein said second strap opening of said means for receiving and securing said cargo restraint member is further positioned substantially near the apex of the acute angle defined by said arcuate upper component of said clasp body.

9. The apparatus of claim 1, wherein the acute angle defined by the arcuate lower component of said clasp body causes a clockwise rotation of said clasp body when said arcuate lower component of said clasp body is caused to engage an anchor rail of an open-top transport vehicle thereby causing the arcuate upper component of said clasp body to slightly overhang said anchor rail.

10. The apparatus of claim 9, wherein said overhang of said arcuate upper component of said clasp body causes said arcuate upper component to engage said anchor rail upon disengagement of said rail by said arcuate lower component of said clasp body.

* * * * *